United States Patent [19]
Yagiela

[11] B 3,921,304
[45] Nov. 25, 1975

[54] GEAR INSPECTION TOOL
[75] Inventor: Frank D. Yagiela, Livonia, Mich.
[73] Assignee: General Motors Corporation, Detroit, Mich.
[22] Filed: Jan. 22, 1973
[21] Appl. No.: 325,261
[44] Published under the Trial Voluntary Protest Program on January 28, 1975 as document no. B 325,261.

[52] U.S. Cl. ............................. 33/179.5 C; 82/44
[51] Int. Cl.² ...................... G01B 5/24; G01B 13/18
[58] Field of Search . 33/179.5 C, 179.5 B, 179.5 R; 279/2; 73/162; 82/44

[56] References Cited
UNITED STATES PATENTS

| | | | |
|---|---|---|---|
| 2,397,494 | 4/1946 | Kuppersmith | 33/DIG. 2 |
| 2,563,910 | 8/1951 | Bean | 33/179.5 B |
| 2,563,994 | 8/1951 | Dougherty | 279/2 |
| 2,734,749 | 2/1956 | Benjamin | 82/44 |
| 2,959,282 | 11/1960 | Pomernacki | 33/179.5 B |
| 3,069,779 | 12/1962 | Bauer et al. | 33/179.5 R |
| 3,299,753 | 1/1967 | Anthony | 279/2 |

FOREIGN PATENTS OR APPLICATIONS
444,209   3/1936   United Kingdom ............ 33/179.5 C

*Primary Examiner*—Richard E. Aegerter
*Assistant Examiner*—Richard R. Stearns
*Attorney, Agent, or Firm*—John P. Moran

[57] ABSTRACT

The inspection tool shown provides for the inspection of lead angles of small helical gears, and includes a spindle assembly and a master gear assembly mounted on a common base member. The master gear assembly is pivotally mounted on the base member, with the master gear thereof rotatably mounted on the master gear assembly and in mesh with a gear to be tested, the latter being mounted on an expanding arbor of the spindle assembly. Rotation of the gear to be tested by the spindle assembly through one revolution rotates the master gear and effectuates the pivoting of the master gear assembly an amount reflective of any variations in the lead angles of the teeth of the gear being tested, such variation being indicated by a suitable air signal means.

2 Claims, 4 Drawing Figures

GEAR INSPECTION TOOL

This invention relates generally to inspection equipment and, more particularly, to equipment for checking for lead angle variations of helical gears.

While a variety of gear inspection tools are known, including sophisticated computorized gear checking equipment, and used primarily for the final inspection of the involute, lead angles, and other characteristics of the teeth of various helical gears, such as pinion and sun gears, it is advantageous to be able to know at the site of the tooth cutting machine whether the lead angles of the gear teeth are running true, so that any deviation from normal can be readily corrected.

Accordingly, an object of the invention is to provide an improved inspection tool for accomplishing the above objective.

Another object of the invention is to provide an inspection tool including improved means for mounting and rotating a gear to be tested, and adjacent checking means including a master gear which meshes with the gear to be tested and is rotated thereby, concurrently pivoting in response to any lead angle variation on the teeth of the gear being tested, with associated air gage means for measuring the amount of the pivoting, and, accordingly, indicating the lead angle variation corresponding thereto.

A further object of the invention is to provide an improved inspection tool consisting of a spindle assembly including an expanding arbor and cam means for actuating same for mounting and rotating a gear to be checked, and a master gear assembly including a pivotally mounted bracket, a master gear rotatably mounted on the bracket and in mesh with the gear to be checked and signal means associated with the bracket for reflecting the amount of pivoting of the master gear and bracket during one complete revolution of the gear to be tested, thereby indicating the amount of variance in the lead angle of the individual and total number of teeth of the tested gear.

These and other objects and advantages of the invention will be apparent when reference is made to the following description and accompanying drawings, wherein.

Figure 1:
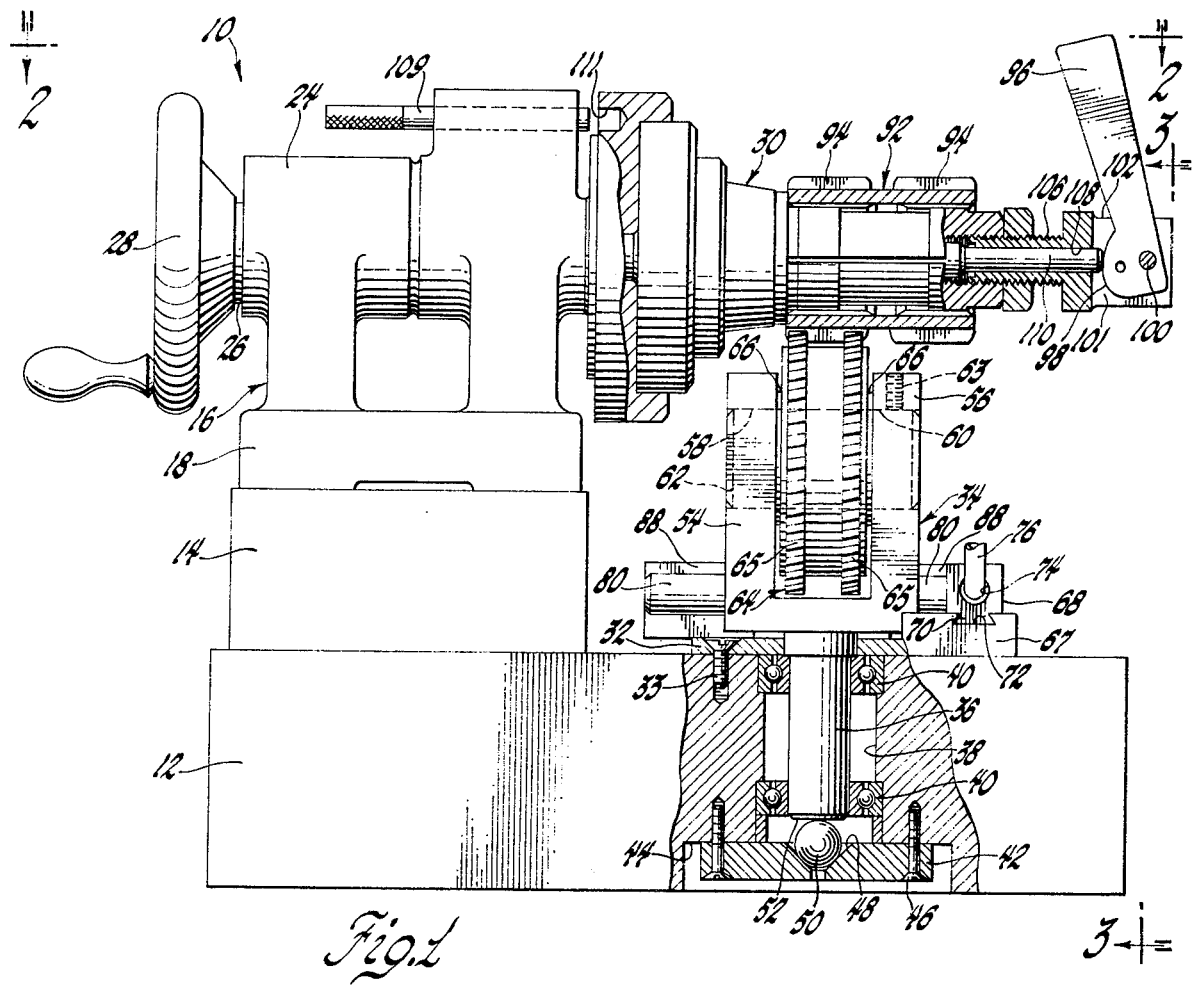
FIG. 1 is a side elevational view, in partial cross-section, of an inspection tool embodying the invention.
Figure 2:
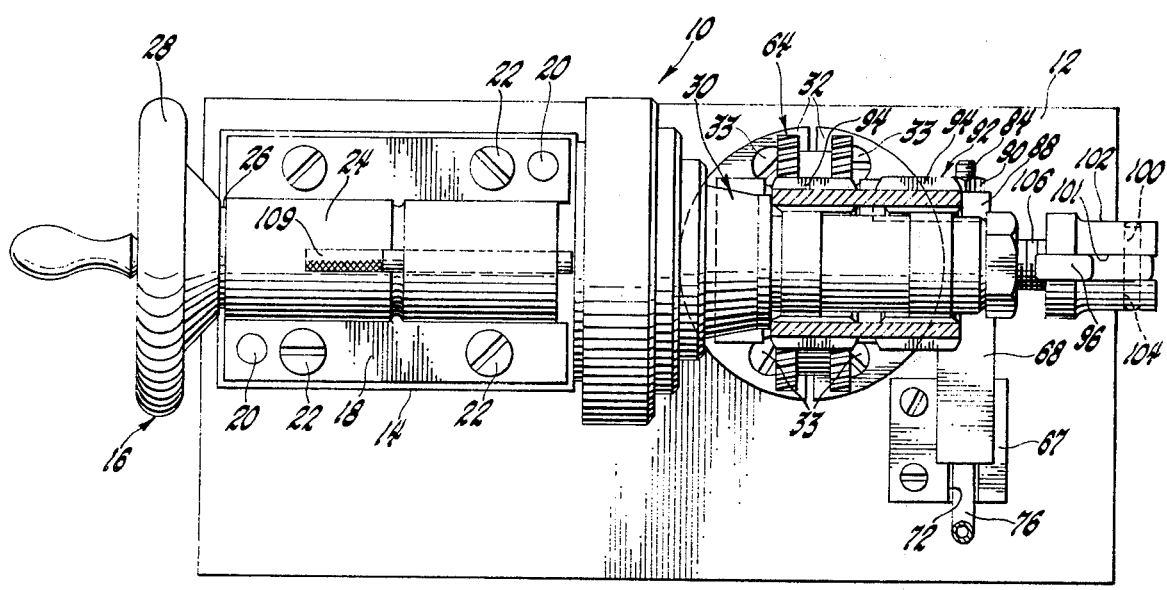
FIG. 2 is a top view taken along the plane of line 2—2 of FIG. 1, and looking in the direction of the arrows.

Referring now to the drawings in greater detail, FIG. 1 illustrates an air gage assembly 10 including a base member 12 having a support block 14 mounted on a portion of the top surface thereof. A spindle assembly 16 includes a base portion 18 which is also mounted on a portion of the top surface of the support block 14, the members 12, 14, and 18 being secured together by dowels 20 and screws 22 (FIG. 2).

The spindle assembly 16 further includes a body portion 24 having a shaft 26 rotatably mounted and extending longitudinally therethrough. A control wheel 28 is secured to one end of the shaft 26 for the manual rotary control of the latter. An expanding mandrel or arbor 30 is mounted on the other end of the shaft 26.

A split sleeve member 32 is secured by screws 33 to another portion of the top surface of the base member 12 directly beneath the expanding mandrel 30. A bracket member 34 is pivotally mounted on the split sleeve member 32 as a result of a rod-like extension 36 of the bracket member 34 extending downwardly through the center of the sleeve member 32 and into a vertical opening 38 formed in the base member 12. The extension 36 is rotatably supported in the opening 38 by a pair of bearings 40.

A disc 42 is mounted in a recess 44 formed in the bottom of the base member 12 concentric with the opening 38, and secured therein by screws 46. A frusto-conical opening 48 is formed in the center of the disc 42. A ball member 50 is mounted in the frusto-conical opening 48 extending above the top surface of the disc 42. The end face 52 of the rod-like extension 36 is seated on the ball member 50, bearing the weight of the bracket member 34.

The bracket member 34 includes a pair of spaced parallel walls 54 and 56 having respective aligned openings 58 and 60 formed therethrough. A shaft 62 is mounted at opposite ends thereof in the respective openings 58 and 60 and retained therein by a setscrew 63 mounted in one of the walls 54 and 56. A master gear 64 having spaced rows of teeth 65 formed around the outer periphery thereof is rotatably mounted on the shaft 62 intermediate the walls 54 and 56. A pair of friction discs 66 are interposed between the inner surfaces of the walls 54 and 56 and the adjacent respective faces of the master gear 64 to retard the rotation of the master gear 64.

A separate bracket 67 is mounted on the top surface of the base member 12 adjacent the split sleeve member 32 (FIG. 2). A mounting block 68 (FIG. 3) is mounted on the bracket 67 by any suitable means, such as male and female dovetail components 70 and 72, respectively. A longitudinal opening 74 (FIG. 1) is formed through the mounting block 68. A tube 76 extends from a suitable air gage, such as a calibrated air column, represented generally at 77 (FIG. 3), into one end of the opening 74, operatively connected to a ball-end follower member 78 slidably mounted in the opposite end of the opening 74 and extending into contact with a surface 79 of an abutment member 80 formed on the bracket member 34. A setscrew 82 retains the member 78 in position in the opening 74, while a larger setscrew 84 is threadedly mounted through an opening 86 formed in a block 88, and retained against an adjacent surface 89 of the abutment member 80 opposite the surface 79 by a jam-nut 90.

Figure 3:
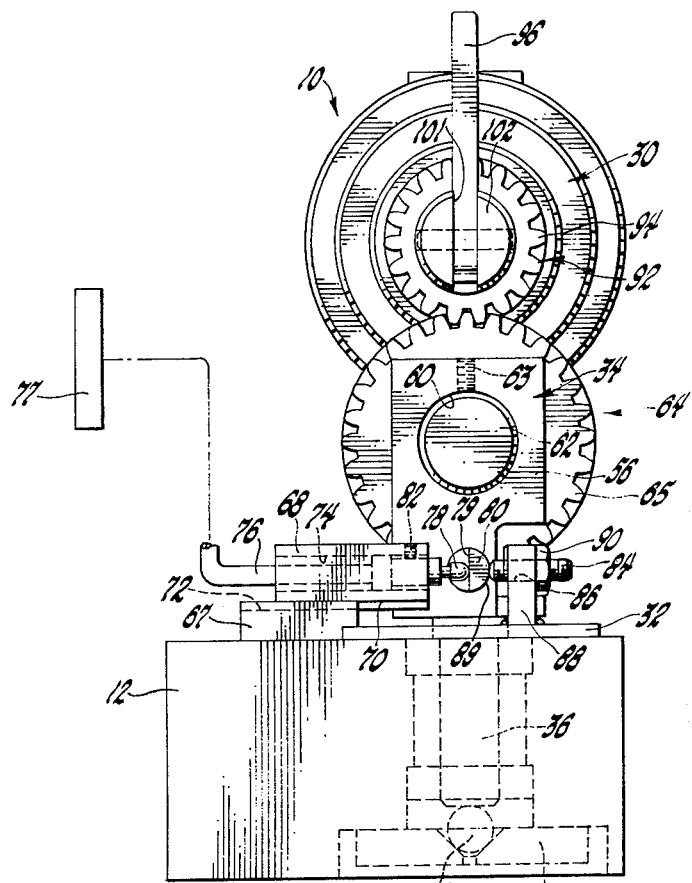
FIG. 3 is an end view taken along the plane of line 3—3 of FIG. 1, and looking in the direction of the arrows.

As may be noted in FIGS. 1 and 3, a gear to be checked, such as a sun gear 92, which may have one or two rows of external teeth 94 formed thereon, is slidably mounted on the expanding mandrel 30 with the teeth 94 which are to be checked meshing with the teeth 65 of the master gear 64. More specifically, since it is the lead angles at both ends of each tooth 94 which it is desirable to have checked, the spacing between the rows of teeth 65 of the master gear 64 is such that the two sets of teeth 65 thereof mesh with the teeth 94 adjacent the respective two ends thereof.

A cam lever 96 having a cam face 98 formed thereon is pivotally mounted around a pivot pin 100 in a slot 101 formed in a round bar-like member 102, the pin 100 being mounted in an opening 104 formed in the member 102. A threaded end 106 is formed on the member 102 and adapted to be threadedly connected to the adjacent end of the expanding mandrel 30. An opening 108 is formed in the threaded end 106 of the member 102, with a piston 110 slidably mounted therein. The piston 110 operates against a suitable fluid, such as grease, contained within the expanding mandrel 30, causing the latter to expand upon leftward movement (FIG. 1) of the piston 110, as caused by the counterclockwise rotation of the cam lever 96, the cam face 98 thereof abutting against the adjacent end of the piston. Such action of the cam lever 96 causes the mandrel 30 to expand into nonslipping frictional contact with the inner surface of the sun gear 92, causing the latter gear to thereafter rotate with the mandrel 30.

Once the sun gear 92 is thus loaded on the expanding mandrel 30, its teeth 94 are in mesh with the teeth 65 of the master gear 64, the spaced rows of teeth 65 being positioned adjacent opposite end portions of the respective teeth 94 of the sun gear 92, as indicated above.

In operation, as the control wheel 28 is rotated through one complete revolution in either rotational direction, the sun gear 92 will rotate such that the forward side of each tooth 94 will contact the adjacent side of each respective adjacent tooth 65 of the master gear 64, causing the master gear 64 not only to rotate against the force of the friction discs 66 but to pivot, along with the bracket member 34, about the axis of the rod-like extension 36 of the bracket member 34. As such pivoting occurs, it may be noted from FIG. 3 that the surface 79 formed on the bracket member 34 will move the ball-end follower member 78 which, in turn, will cause an air signal to be routed through the tube 76 to effectuate a change observable on the calibrated air column or gage 77, indicative of any condition of lead variation of the teeth 94. Predetermined limits of this gage-reading will determine whether or not the limits of variation in lead angles of all the teeth 94, throughout one revolution of the sun gear 92, is within a permissible predetermined tolerance.

The fit between the teeth 94 and the teeth 65 is such that when one side of each tooth 94 is in contact with the adjacent side of each respective tooth 65 of the master gear 64, the trailing side of each respective engaged tooth 94 is spaced a predetermined minimal distance apart from the oncoming side of the following tooth 65, i.e., there is a predetermined slack therebetween. Now, in order to check such other sides of the teeth 94, it is only necessary to rotate the control wheel 28 through one complete revolution in the opposite direction, against the resistance of the friction discs 66. The slack between the teeth 94 and 65 will have been eliminated upon movement of the first tooth 94 into contact with the adjacent tooth 65, and individual and maximum lead angle variations will again be reflected at the air gage 77.

To check the other set of teeth 94 of the dual-type sun gear 92 shown, it is merely necessary to rotate the cam lever 96 back to the horizontal position, remove sun gear 92 from the mandrel 30, slidably re-mount the sun gear 92 on the mandrel 30 in the opposite direction, and proceed through the sequence described above relative to the first row of teeth 94.

A pin member 109 is slidably mounted through an upper portion of the body portion 24 of the spindle assembly 16 suitable for manual insertion into an opening 111 formed in an adjacent face of the mandrel 30 when it is desirable to prevent the mandrel 30 from being rotated.

FIG. 4 Embodiment

Figure 4:
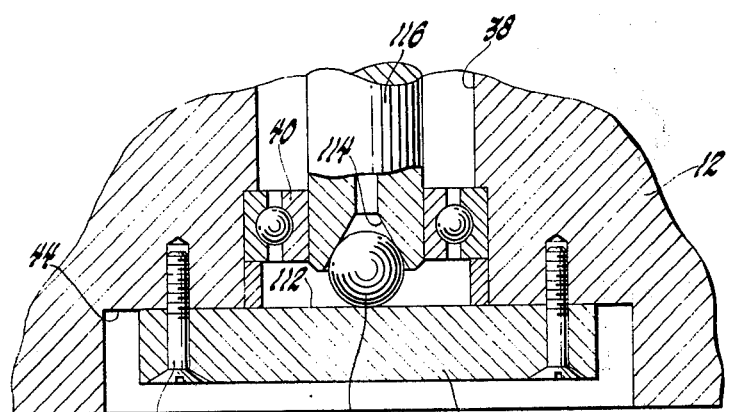
FIG. 4 is a fragmentary cross-sectional view of an alternate embodiment of a portion of the FIG. 1 structure.

If desired, the ball member 50, the frusto-conical opening 48 and the end face 52 of the extension member 36, as illustrated in FIG. 1, may be substituted by the arrangement illustrated in FIG. 4. The latter arrangement includes a flat upper surface 112 of the disc 42, with the ball member 50 being mounted on a central point thereof and maintained in position thereon by virtue of being confined in a frusto-conical opening 114 formed in the lower end of a rod-like extension 116 from the bracket member 34, the extension 116 replacing the extension 36 of FIG. 1. Operationally, the bracket member 34 and its accompanying master gear 64 pivot in the same manner in both the FIG. 1 and FIG. 4 embodiments to reflect lead angle variations as previously described.

It should be realized that, while the above description is directed toward helical gear inspection, the assembly 10 could be used to check spur gears to determine any variation from infinite lead by using an appropriate master gear 64.

While but two embodiments of the invention have been shown and described, other modifications thereof are possible.

I claim:

1. A tool for inspecting lead angles at each end portion of each tooth of a helical gear, said tool comprising a base member, a rotary control spindle mounted on said base member, an expanding mandrel mounted on said spindle, a fixed sleeve member, piston means slidably mounted in said sleeve member and operatively connected to said expanding mandrel, a lever pivotally mounted on an end portion of said sleeve member, a cam surface formed on said lever in contact with an end face of said piston means for causing said piston means to expand said mandrel in response to pivotal movement of said lever once said helical gear has been manually placed around said mandrel to grippingly engage said helical gear, a vertical opening formed in said base member, a plate secured to said base member adjacent the bottom edge of said opening, a ball member rotatably mounted on said plate, a bracket member having spaced parallel side walls interconnected by a bottom wall, with the vertical center thereof being located beneath the axial midpoint between said end portions of the teeth of said helical gear, a stem member extending downwardly from said vertical center of said bottom wall of said bracket member through said vertical opening and mounted on said ball member for rotatably supporting said bracket member thereon, bearing means mounted in said vertical opening for vertically aligning and rotatably supporting said stem member, a master gear rotatably mounted on a shaft supported between said spaced parallel side walls of said bracket member, friction discs mounted intermediate the outer side surfaces of said master gear and the adjacent inner surfaces of said spaced parallel side walls for providing a sliding resistance to the rotation of said master gear, an abutment surface formed on an outer surface of one of said spaced parallel side walls of said bracket member, the plane of said abutment surface being such that it extends through the axis of said stem member, two spaced rows of teeth formed around the outer periphery of said master gear and suitable for contacting one side of said respective end portions of said helical gear teeth, an air gage, a follower member abutting against said abutment surface of said bracket member, and pressure signal-actuating means operatively connected between said follower member and said air gage for causing said air gage to indicate the amount of pivot of said bracket member about said axis of said stem member as said master gear is caused to rotate during one complete revolution of said helical gear by manual rotation of said spindle, the amount of pivot corresponding to the variation in lead angles of said one side of said end portions of each and all teeth of said helical gear, with the variation in lead angles of the other side of said end portions of each and all teeth being indicated by reversing the rotation of said spindle.

2. A tool for inspecting lead angles at each end portion of each tooth of each row of two spaced rows of teeth of a dual-type helical gear, said tool comprising a base member, a manually rotatable rotary control spindle mounted on said base member, an expanding mandrel mounted on said spindle, a fixed sleeve member, piston means slidably mounted in said sleeve member and operatively connected to said expanding mandrel, a lever pivotally mounted on an end portion of said sleeve member, a cam surface formed on said lever in contact with an end face of said piston means for causing said piston means to expand said mandrel in response to pivotal movement of said lever once said helical gear has been manually placed around said mandrel to grippingly engage said helical gear, a vertical opening formed in said base member, a plate secured to said base member adjacent the bottom edge of said vertical opening, a ball member rotatably mounted on said plate, a bracket member having spaced parallel side walls interconnected by a bottom wall, with the vertical center thereof being located beneath the axial midpoint between said end portions of one of said two spaced rows of teeth of said engaged helical gear, a stem member extending downwardly from said vertical center of said bottom wall of said bracket member through said base member vertical opening and mounted on said ball member for rotatably supporting said bracket member thereon, bearing means mounted in said base member vertical opening for vertically aligning and rotatably supporting said stem member, a master gear rotatably mounted on a shaft supported between said spaced parallel side walls of said bracket member, friction discs mounted intermediate the outer side surfaces of said master gear and the adjacent inner surfaces of said spaced parallel side walls for providing a sliding resistance to the rotation of said master gear, an abutment surface formed on an outer surface of one of said spaced parallel side walls of said bracket member, the plane of said abutment surface being such that it extends through the axis of said stem member, two spaced rows of teeth formed around the outer periphery of said master gear and suitable for contacting one side of said respective end portions of the teeth of said one row of said helical gear teeth, an air gage, a follower member abutting against said abutment surface of said bracket member, and pressure signal-actuating means operatively connected between said follower member and said air gage for causing said air gage to indicate the amount of pivot of said bracket member about said axis of said stem member as said master gear is caused to rotate during one complete revolution of said helical gear by manual rotation of said spindle, the amount of bracket pivot corresponding to the variation in lead angles of said one side of said end portions of each and all teeth of said one row of teeth of said helical gear, with the variation in lead angles of the other side of said end portions of said each and all teeth of said one row of teeth being indicated by manually reversing the rotation of said spindle, and the variation in lead angles of the teeth of the end portions of the other row of said two spaced rows of teeth of said helical gear being determinable by reversing the longitudinal position of said dual-type helical gear on said expanding mandrel, thereby locating said other row of said two spaced rows of teeth of said helical gear in contacting relationship with said two spaced rows of teeth of said master gear.

* * * * *